Dec. 1, 1936. W. R. SIMONS Re. 20,188

BUILDING CONSTRUCTION

Original Filed Oct. 15, 1930

INVENTOR.
Walter R. Simons
BY Robt. D. Pearson
ATTORNEYS.

Reissued Dec. 1, 1936 Re. 20,188

UNITED STATES PATENT OFFICE 20,188

BUILDING CONSTRUCTION

Walter R. Simons, Los Angeles, Calif.

Original No. 1,870,967, dated August 9, 1932, Serial No. 488,775, October 15, 1930. Application for reissue October 16, 1936, Serial No. 106,046

13 Claims. (Cl. 72—30)

This invention relates to an improved building construction adapted to combining reinforced cementitious material with stone or brick work.

An object of the invention is to provide means for housing the metallic reinforced members in a more complete and satisfactory manner and in such a situation that they will not be unduly expanded or contracted by change of temperature.

Another object of the invention is to provide a structure of the character stated which may be erected at a low cost and which may be assembled in a more rapid and efficient manner.

Still another object of the invention is to provide, in conjunction with other improved features of the invention, a series of metallic tie pieces which cooperate with each other and with the remaining metallic parts of the reinforcing structure, in an improved and more efficient manner.

Yet another object of the invention is to provide a wall structure of a superior shock withstanding character wherein a greater rigidity is maintained throughout the center joint of the wall than exists at the bed joints thereof, thereby adapting the wall to resist a greater shock without a complete collapse.

Other objects, advantages and features of invention may hereinafter appear.

Referring to the accompanying drawing which illustrates what is at present deemed to be a preferred embodiment of the invention, Figure 1 is a sectional end view of a wall constructed according to the principles of the invention, the sectioned portion of the view being taken on line 1—1 of Figure 2.

Figure 1:
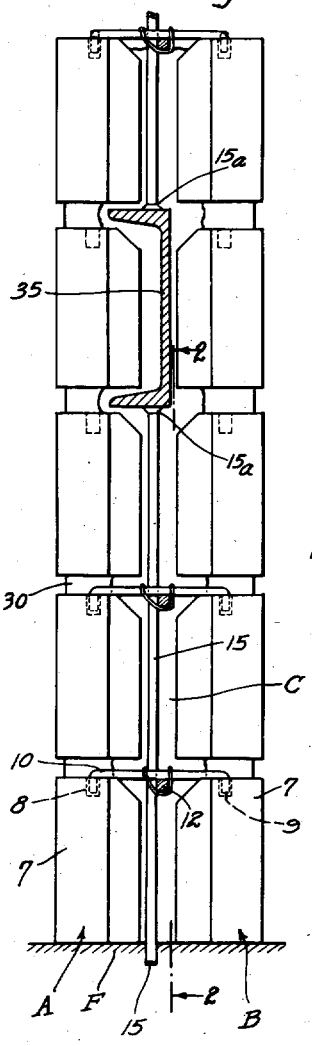

Referring in detail to the drawing, the wall structure shown comprises two vertical wall units A and B which are placed side by side in parallel spaced relation to each other in order to receive between them a filling of cement C in the form of a grout which flows readily and which when it has hardened adheres firmly both to the metallic and other elements of the structure with which it comes into contact, thus cementing the whole structure firmly together.

Figure 4:
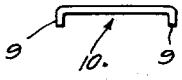
Figure 4 is a side elevation of one of the metallic tie pieces.

Said wall units A and B, in the illustrated form of the invention, are of identical construction and are made up from the individual brick or other solid building elements 7. Each of said bricks has in its upper face or edge portion recesses 8 which receive the downwardly directed end portions 9 of the tie pieces 10 and 10*a* shown in detail in Figure 4.

Figure 3:
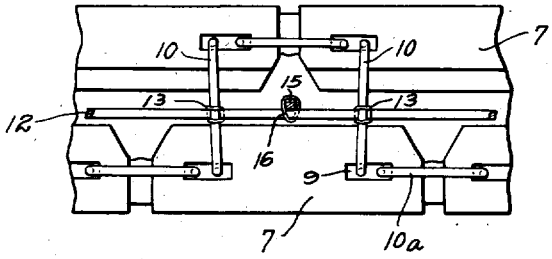
Figure 3 is a plan view of a fragment of the wall, certain reinforcing elements being sectioned.
Figure 2:
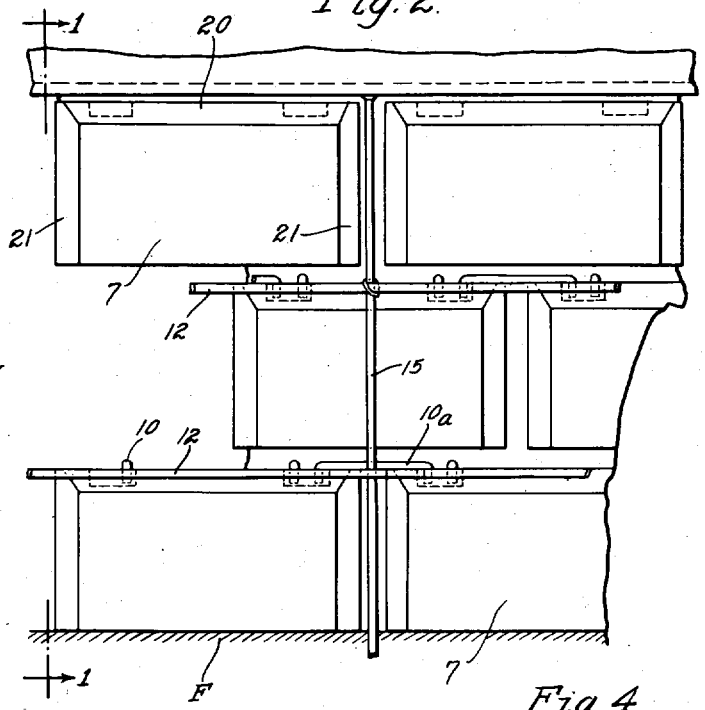
Figure 2 is a vertical section of a portion of the wall shown in Figure 1 taken on line 2—2 of the latter view.

The tie pieces 10 shown in Figure 1 are arranged in transverse sets, while in Figures 2 and 3 are illustrated not only the transverse tie pieces 10, but also the longitudinally extending tie pieces 10*a*, each recess 9 being occupied not only with the end portion of a tie piece 10, but also with the end portion of a tie piece 10*a*. The tie pieces 10 are intersected by the longitudinal tie rods 12 and, during the building of the structure, are held to said rods 12 by means of tie pieces 13 of small wire.

Vertical tie rods 15 are also provided, the latter being embedded within the cement core C in spaced relation to the brick work. Said tie rods 15 intersect the longitudinal tie rods 12 and where these intersections take place are tied to them by means of small wire or like material 16.

In the preferred form of brick shown, each brick is provided along one edge face thereof with a longitudinal bevel 20 and with end bevels 21. The bevels 20 may be at an angle of approximately 45 degrees, and the bevels 21 be steeper, say 30 degrees, as shown. Opposite to the bevel 20 each brick is provided with the usual right angled corner, and when the bricks are assembled in the wall units A and B, this right angled corner is stationed at the outer face of the structure. When the bricks are assembled the bevels 20 and 21 cooperate with each other to provide adequate space for the mortar, grout and tie pieces as will be more clearly understood from the description following.

The various courses of bricks are united in proper vertically spaced relation to each other by means of the usual mortar layers or elements 30, these mortar elements, however, occupying only the outer portion of the wall, the space between them as well as between the bricks which they unite being filled in by the grout C already mentioned.

In Figure 1 is illustrated the preferred method of embedding within the wall a transverse floor beam or girder 35, channel-shaped in cross section. This beam 35 has the ends of the adjacent vertical rods 15 welded thereto at 15*a* as shown. Said channel-shaped beam is so positioned that each of its flanges extends into a space between two courses of brick, or may be otherwise positioned, if desired.

The cementitious material which occupies the center joint between the wall units A and B is of a harder more resisting character than the lime mortar which forms the bed joints 30. The center joint being provided not only with the hardest and strongest cement, but also being strongly reinforced by the vertical rods 15, in its combination with the less resisting bed joints 30 nearer the sides of the wall will provide a shock resisting wall which will not collapse even though some breakage may occur at the bed joints 30 when the wall is subjected to shock.

In building up the wall structure which has been described, a metallic frame work comprising the plurality of upright tie rods and girders 35, together with other elements (not shown), will first be put in place, the lower ends of the lowest rods 15 being anchored in the foundation F, the upper ends of these rods being located at the level to be occupied by the first floor beam 35. Then the lowest course of brick will be put in place for each of the units A and B, these courses of brick being put in parallel spaced relation to each other with the upright rods 15 between and in spaced relation to them. Then the transverse tie pieces 10 and longitudinal tie pieces 10a will be put in place as best shown in Figure 3 and the horizontal rod 12 will next be wired to the transverse tie pieces 10 by small wire 13. Thereupon the upright rods 15 will each be wired by small wire 16 to the horizontal rod 12. Next the second course of brick will be laid in place upon the lower course, and then the second set of transverse tie pieces 10 and longitudinal tie pieces 10a will be put in place and the small tie wires 13 and 16 applied as already described. The third course of brick, assuming the wall to be built as in Figure 1 will now be put in place. This will bring the wall up to the level of the floor beam 35. The cement in the form of grout may now be poured in between the two wall units A and B, said space thus being filled with cement up nearly to the top of the upright tie pieces 15.

The use of the floor beam 35 and the particular method of building the wall which has been set forth is only intended to be suggestive, it being understood that in many instances a different procedure will be followed. The invention is applicable to building wall structures according to a variety of designs of wall building not employing the steel girders.

The invention includes not only the general wall structure which has been described, but also the specific individual bricks formed with the recesses and chamfered edge portions which have been described. The chamfering of each brick along its end edge facilitates the flow of cement grout from the central portion of the structure toward each side thereof.

It is to be understood that the invention is not limited to the specific construction illustrated in the drawing, but that variations therein, within the scope of the appended claims, may be made without departing from the spirit of the invention. For example, the use of small wire to tie the upright and transverse metallic reinforcing elements together may not be necessary and will only be used if thought desirable.

I claim:

1. In a building construction for walls, a pair of adjacent upright wall units having inner faces which are in parallel spaced relation to each other, each of said wall units being composed of courses of brick, the brick of said courses at one side of the wall being each beveled away at the upper edge of its inner face toward the mid-width of the wall, oppositely disposed bevels thus being provided which enlarge the space between said wall units, a substantially horizontal tie rod located in the enlarged space thus provided, additional metallic structure to which said tie rod is secured, and a cementitious filling occupying the space between said courses together with said enlarged space and adhering to the inner faces of the brick and to the aforementioned tie rod and metallic structure.

2. In a building construction for walls, a pair of adjacent upright wall units having inner faces which are in parallel spaced relation to each other, each of said wall units being composed of courses of solid building elements, the building elements of said courses at one side of the wall being each beveled away to the upper edge of its inner face toward the mid-width of the wall, oppositely disposed bevels thus being provided which enlarge the space between said wall units, a substantially horizontal tie rod located in the enlarged space thus provided, transversely extending metallic structure to which said tie rod is secured, and a cementitious filling occupying the space between said courses together with said enlarged space and adhering to the inner faces of the building elements and to the aforementioned tie rod and metallic structure.

3. In a building construction for walls, a pair of adjacent upright wall units having inner faces which are in parallel spaced relation to each other, each of said wall units being composed of courses of solid building elements, the building elements of said courses at one side of the wall being each beveled away to an edge of its inner face toward the mid-width of the wall, oppositely disposed bevels thus being provided which enlarge the space between said wall units, a cementitious filling occupying the space between said courses together with said enlarged space, and reinforcing metallic elements which intersect each other within said enlarged space.

4. In a wall structure, two upright series of building blocks arranged in courses, said courses forming spaced wall units, said units having nonmetallic bonding reinforcing means between them, said means including a uniting bond of resistant grout filling provided at the point of juncture of the blocks with an enlarged core presenting substantial supporting areas, said blocks being provided with seats for said enlarged core and separated to provide angularly disposed intersecting mortar joints aligned with the faces of said enlarged core whereby the inner face of each block provides an increased cross-sectional area for the grout where the grout joins the mortar joints to give increased adhesion surfaces for the grout aligned with the mortar joint, said mortar joints combining with the grout to increase the strain resisting properties of the wall structure, the mortar in the wall joints being less resistant than the grout to permit the wall to withstand greater shock without collapse.

5. In a wall structure, two upright series of building blocks arranged in courses, said courses forming spaced wall units, said units having nonmetallic bonding and reinforcing means between them, said means including a uniting bond of resistant grout filling provided with outwardly extending symmetrical ribs each presenting a beveled supporting face terminating in an edge portion of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints, to give increased adhesion surfaces aligned with the mortar joint for the grout, said mortar joints combining with the grout to increase the strain resisting properties of the wall structure, the mortar in the wall joints being less resistant than the grout to permit the wall to withstand greater shock without collapse.

6. In a wall structure, two upright series of building blocks arranged in courses, said courses forming spaced wall units, said units having non-metallic bonding and reinforcing means between them, said means including a uniting bond of resistant grout filling provided on its opposite faces with outwardly extending symmetrical ribs each presenting a beveled supporting face terminating in an edge portion of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints, to give increased adhesion surface aligned with the mortar joint for the grout, said motar joints combining with the grout to increase the strain resisting properties of the wall structure, the mortar in the wall joints being less resistant than the grout and being sufficiently compressible to permit the wall to withstand greater shock without collapse.

7. In a wall structure, two upright series of building blocks arranged in courses, said courses forming spaced wall units, said units having non-metallic bonding and reinforcing means between them, said means including a uniting bond of resistant grout filling provided on its opposite faces in staggered relation to one another with outwardly extending symmetrical ribs each presenting a beveled supporting face terminating in an edge portion of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints to give increased adhesion surfaces aligned with the mortar joint for the grout, said mortar joints combining with the grout to increase the strain resisting properties of the wall structure, the mortar in the wall joints being less resistant than the grout to permit the wall to withstand greater shock without collapse.

8. In a wall structure, two upright series of building blocks arranged in offset courses, said courses forming spaced wall units, said units having non-metalic bonding and reinforcing means between them, said means including a uniting bond of resistant grout filling provided on its opposite faces in staggered relation to one another with outwardly extending symmetrical ribs presenting a beveled supporting face terminating in an edge of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints, to give increased adhesion surfaces aligned with the mortar joint for the grout, said mortar joints offset from one another on opposite sides of the wall combining with the grout to increase the strain resisting properties of the wall structure, the mortar in the wall joints being less resistant than the grout to permit the wall to withstand greater shock without collapse.

9. In a wall structure, two upright series of building blocks arranged in courses, said courses forming spaced wall units, said units having non-metallic bonding reinforcing means between them, said means including a uniting bond of resistant grout filling provided at the point of juncture of the blocks with an enlarged core presenting substantial supporting areas, said blocks being provided with seats for said enlarged core and separated to provide angularly disposed intersecting mortar joints aligned with the faces of said enlarged core whereby the inner face of each block provides an increased cross-sectional area for the grout where the grout joins the mortar joints to give increased adhesion surfaces for the grout aligned with the mortar joint, said mortar joints combining with the grout to increase the strain resisting properties of the wall structure, the mortar in the wall joints being less resistant than the grout to permit the wall to withstand greater shock without collapse, and reinforcing metallic elements intersecting each other within said enlarged core.

10. In a wall structure, two upright series of building blocks arranged in courses, said courses forming spaced wall units, said units having non-metallic bonding and reinforcing means between them, said means including a uniting bond of resistant grout filling provided with outwardly extending symmetrical ribs each presenting a beveled supporting face terminating in an edge portion of substantial area, said blocks being separated to provide angularly disposed intersecting mortar joints aligned with the edge portion formed by the face of said symmetrical ribs, whereby the inner face of each block provides an increased and uniform cross-sectional area, for the grout where the grout joins the mortar joints, to give increased adhesion surfaces aligned with the mortar joint for the grout, said mortar joints combining with the grout to increase the strain resisting properties of the wall structure, the mortar in the wall joints being less resistant than the grout to permit the wall to withstand greater shock without collapse, and reinforcing meallic elements intersecting each other within said enlarged core.

11. In a wall structure, two upright series of building blocks arranged in courses, said courses forming spaced wall units, said units having non-metallic bonding and reinforcing means between them, said means including a uniting bond of resistant grout filling provided on its opposite faces with outwardly extending symmetrical ribs each presenting a beveled supporting face terminating in an edge portion of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints, to give increased adhesion surface aligned with the mortar joint for the grout, said mortar joints combining with the grout to increase the strain resisting properties of the wall structure, the mortar in the wall joints being less resistant than the grout and being sufficiently compressible to permit the wall to withstand greater shock without collapse, and horizontally and vertically disposed metallic elements spaced within said enlarged core.

12. In a wall structure, two upright series of building blocks arranged in courses, said courses forming spaced wall units, said units having non-metallic bonding and reinforcing means between them, said means including a uniting bond of resistant grout filling provided on its opposite faces in staggered relation to one another with outwardly extending symmetrical ribs each presenting a beveled supporting face terminating in an edge portion of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints, to give increased adhesion surfaces aligned with the mortar joint for the grout, said mortar joints combining with the grout to increase the strain resisting properties of the wall structure, the mortar in the wall joints being less resistant than the grout to permit the wall to withstand greater shock without collapse, and substantially horizontally and vertically disposed metallic elements placed at spaced intervals within said enlarged core.

13. In a wall structure, two upright series of building blocks arranged in offset courses, said courses forming spaced wall units, said units having non-metallic bonding and reinforcing means between them, said means including a uniting bond of resistant grout filling provided on its opposite faces in staggered relation to one another with outwardly extending symmetrical ribs presenting a beveled supporting face terminating in an edge of substantial area, said blocks being separated to provide angularly disposed intersecting mortar joints aligned with the edge portion formed by the faces of said symmetrical ribs, whereby the inner face of each block provides an increased and uniform cross-sectional area for the grout where the grout joins the mortar joints, to give increased adhesion surfaces aligned with the mortar joint for the grout, said mortar joints offset from one another on opposite sides of the wall combining with the grout to increase the strain resisting properties of the wall structure, the mortar in the wall joints being less resistant than the grout to permit the wall to withstand greater shock without collapse, and substantially horizontally and vertically disposed spaced metallic elements within said enlarged core.

WALTER R. SIMONS.